United States Patent [19]

Pitner

[11] 3,809,446

[45] May 7, 1974

[54] THRUST ROLLING BEARING

[75] Inventor: Alfred Pitner, Paris, France

[73] Assignee: Nadella, Rueil-Malmaison, France; a part interest

[22] Filed: July 7, 1972

[21] Appl. No.: 269,812

[30] Foreign Application Priority Data

July 7, 1971   France .............................. 71.24800

[52] U.S. Cl. ................................ 308/217, 308/234
[51] Int. Cl. ....................... F16c 19/20, F16c 19/00
[58] Field of Search ............................ 388/235, 217

[56] References Cited
UNITED STATES PATENTS
3,328,098   6/1967   Budzich ............................ 308/235

Primary Examiner—Manuel A. Antonakas
Assistant Examiner—Frank Susko
Attorney, Agent, or Firm—Robert E. Burns; Emmanuel J. Lobato

[57] ABSTRACT

Thrust rolling bearing comprising a cage containing and guiding rolling elements. The cage is in two parts, namely a first part having bars defining apertures for the rolling elements and a second part in the form of a ring which has a plane sliding support face. The two parts are interconnected in such manner that they are relatively rotatable.

An assembly is disclosed in which the thrust rolling bearing is combined with a coaxial radial needle bearing and the needle ends, or the end of the cage for the needles, bears against the plane sliding support face.

15 Claims, 9 Drawing Figures

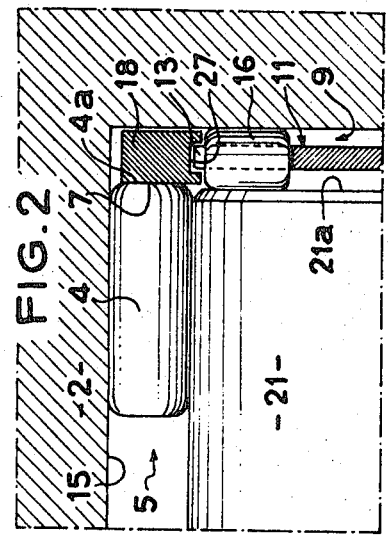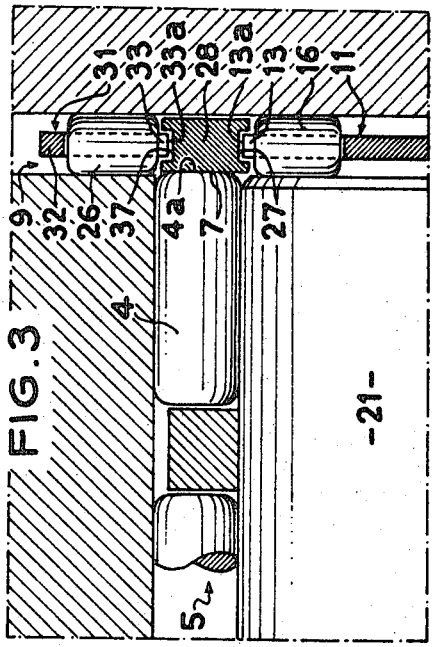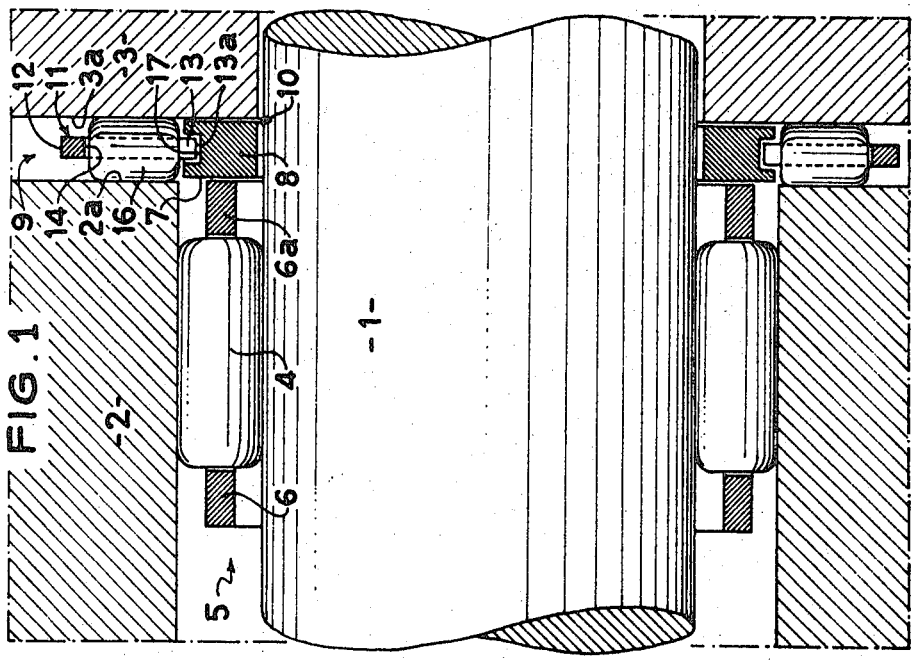

THRUST ROLLING BEARING

The present invention relates to rolling thrust bearings comprising a cage which contains and guides rolling elements and in which is provided a plane face constituting a sliding support face perpendicular to the axis of the bearing.

In such a bearing, which is disclosed in particular in British Pat. No. 828,232, the sliding support face, against which abuts for example the ends of the needles of an adjacent radial rolling bearing, must have an excellent surface condition and high hardness which requires a suitable heat treatment. Further, in view of the fact that the cage is in one piece, this arrangement has for disadvantage to cause the radial bearing needle ends or cage to move along the cage of the axial or thrust rolling bearing which is braked, perhaps very powerfully, if the pressure exerted by the radial rolling bearing on this cage is appreciable. Owing to the fact that the part of the cage in which apertures are formed for retaining the rolling elements may remain ductile so as to avoid damaging the rolling elements in operation and possibly to permit by its resilient deformation the positioning of the rolling elements, it is highly desirable that the heat treatment be localized in the annular region which serves as a sliding support face. However, such a localized heat treatment gives rise to well-known difficulties and the problem of the construction of a thrust rolling bearing with a sliding support face has not been solved satisfactorily up to the present time. In this respect there may be mentioned the German Pat. Application D.T. O.S. 1,910,840 which discloses a composite cage for a thrust rolling bearing in which the two parts of the cage fit together radially and jointly guide the rolling elements but, here again the problem of the sliding support face is unsolved.

An object of the present invention is to provide a solution to this problem.

The invention provides a thrust rolling bearing whose cage is in at least two parts, wherein apertures provided in one of said parts for receiving the rolling elements are defined by bars and the other part, on which the sliding support face is provided, constitutes a ring assembled in such manner with the ends of the bars that said two parts are free to rotate with respect to each other. Further, the dimensions and the tolerances of the two parts constituting the cage are such that if the part on which the sliding support face is formed is in contact with the extension of one of the races for the rolling elements which said cage encompasses, the part of said cage which guides the rolling elements is freely rotatable by said rolling elements. Consequently, the cage part carrying the sliding support face can come in contact with one of the planes defined by the races for the rolling elements without the other part being in contact, between the rolling elements, with one of said planes or with the rolling elements themselves.

In this arrangement it is possible to heat treat the part or ring on which the sliding support face is formed, whereas the complementary part having the apertures is not hardened by a heat treatment and can therefore have the required ductility. This ductility permits if desired positioning the rolling elements by deformation of the bars, even if the latter are provided with projecting portions for axially retaining the rolling elements, and achieving, by a resilient or plastic deformation of the bars, the assembly of the two parts of the cage which is preferably obtained by engaging the end of the bars in a groove formed in one of the cylindrical faces of the hard ring. This engagement can be the result of a plastic deformation of the bars which tends to cause their ends to enter the groove or of a resilient clipping by the effect of a bending of the bars.

The two parts constituting the cage can also be assembled by urging together, by a plastic deformation, the two flanks of a groove formed in the end portion of the bars on either side of a radial rib provided on the cylindrical face of the hard ring.

The feature in accordance with which the two parts of the cage are rotatable with respect to each other affords an additional advantage in that the hard ring acting as the sliding support face can rotate at a speed different from that of the other part which retains the needles. The speed of the ring is determined by the action of the forces of contact exerted by the bars defining the apertures or by the application on the sliding support face of adjacent members, so that the movement of the ring is automatically adapted to the conditions of operation.

It should be also be mentioned that the rolling elements may be radially introduced without difficulty when the ring has only one rim.

According to the present invention, it is specially arranged that the parts of the cage are centered with respect to each other by the rolling elements and not by the male end portions of one of the parts of the cage which never come in contact with the inner end of the groove in the other part of the cage.

Another object of the invention is to provide an assembly of the composite thrust rolling bearing described hereinbefore in adjoining relation to a radial needle bearing, the pitch circle of the needles being in alignment with the ring part of the thrust bearing, the sliding support face being in sliding contact with the adjacent ends of the needles of the radial bearing or with the adjacent rim of the cage which may contain the needles.

Further features and advantages of the invention will be apparent from the ensuing description with reference to the accompanying drawings.

In the drawings:

FIG. 1 is an axial sectional view of an assembly of a thrust rolling bearing adjoining a radial rolling bearing with a shaft extending through the two bearings;

FIG. 2 is a partial axial sectional view of an assembly similar to that shown in FIG. 1 in which a journal encompassed by the radial rolling bearing bears axially against the thrust rolling bearing;

FIG. 3 is a partial axial sectional view of an assembly similar to that shown in FIG. 2 in which the thrust rolling bearing has two concentric rows of rolling elements;

Figure 4:
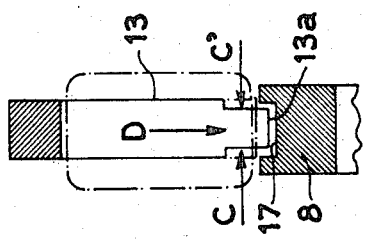
FIGS. 4–7 are diagrammatic partial views of different assemblies of the component parts of the cage of the thrust rolling bearing shown in FIGS. 1–3, the part of the cage in which the apertures are formed being formed from a single thickness of sheet metal.

It should be understood that the invention is not intended to be limited by the embodiments shown in FIGS. 1-9. For example, it is possible to employ a thrust bearing cage in which the ends of the bars are interconnected by a rim instead of being free.

In the assembly shown in FIG. 1, a shaft 1 and a mechanical member 2 are mounted to rotate with respect to each other and with respect to a frame structure 3, through which the shaft 1 extends, through the agency of a radial needle bearing 5 whose needles 4 are contained in a cage 6 whose rim 6a, adjacent the structure 3, is in sliding contact with a plane support face 7 formed on a ring 8 which is one of the component parts of a cage of a thrust roller bearing 9 the other component part of which is formed by a washer 11 of sheet metal which is thinner than the ring 8 and has a peripheral rim 12 with which are integral radial bars 13 defining apertures 14 which retain and guide rollers 16 interposed between parallel faces 2a and 3a of the mechanical member 2 and the structure 3 respectively.

The assembly of the ring 8 and washer 11 which constitutes the cage 10 is obtained by the engagement of the free end portion 13a of the bars 13 in a groove 17 which has a flat inner face and is formed in the cylindrical periphery of the ring 8. This ring 8 is produced by machine turning or by a sintering process and has undergone a heat treatment which imparts thereto such hardness that the support face 7 can perform its function as an abutment face for the rim 6a of the cage of the radial rolling bearing 5. The bars 13 are engaged with clearance in the groove 17 so that the two parts 8, 11 of the cage are free to rotate with respect to each other.

In FIG. 2 the needles 4 of the radial rolling bearing 6 are interposed between a bore or aperture 15 in a support structure 23 and a journal 21 whose end face 21a bears against rollers 16 of the thrust roller bearing 9 whose washer 11 occupies a central position and is assembled with a peripheral ring 18 against the support face 7 of which the ends 4a of the needles of the radial rolling bearing bear directly.

In FIG. 3 the needles 4 of the radial bearing 5 are interposed between the journal 21 and the rotatable mechanical member 2. In order to absorb the axial load of the two rotating parts 21, 22, the thrust rolling bearing 9 has two rows of rollers 16, 26 which are respectively retained in a centre washer 11 and a peripheral washer 31 which have bars 13 and 33 respectively.

The free ends 13a and 33a of the latter are engaged and retained in grooves 27 and 37 formed in the respective cylindrical faces of the hard metal ring 28 whose plane support face 7 is in sliding contact with the needle ends 4a of the needles 4 of the radial rolling bearing 5.

As a result of the assembly with clearance of the bars 13, 33 in the grooves 27, 37, the two washers 11, 31 are free to rotate with respect to each other and with respect to the hard ring 28 interposed therebetween.

FIGS. 4-7 show various manners of assembling the washer 11 and the ring 8 having the support face 7.

In FIG. 4, the washer 11 is preformed so that the bars 13 have a hump portion 35 and such length than their free end 13a can be disposed without deformation in alignment with the groove 17 around the ring 8. A subsequent crushing (arrow A) of the hump portion 35, imparting to the bars 13 a rectilinear shape by plastic deformation, causes the end portion 13a of the bars to enter the groove 17 (arrow B) and unite the washer 11 and ring 8.

Figure 5:
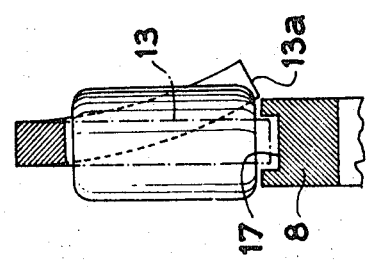

In FIG. 5, the end portion 13a of the bars 13 is engaged in the groove 17 of the ring 8 by a resilient clipping due to a bending of the bars 13.

Figure 6:
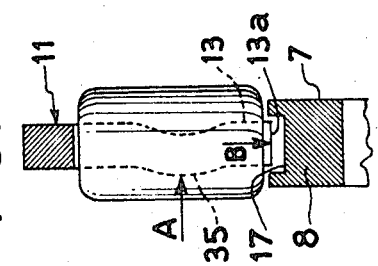

In the embodiment shown in FIG. 6, the bars 13 are initially straight and have such length that their end portion 13a can be placed without deformation in alignment with the groove 17, a subsequent crushing of the end portion 13a (arrows C, C') causes this end portion to be elongated (arrow D) which causes the end portion to enter the groove 17 and achieve the assembly.

Figure 7:
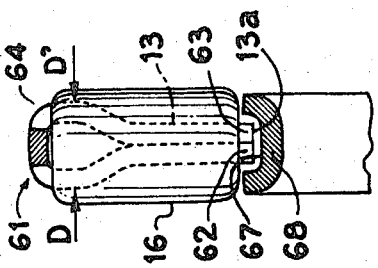

In FIG. 7, the ring 38 having a plane support face 7 includes on its outer cylindrical face, not a groove 17 as in the foregoing embodiments, but a rib 39 and the end portions of the bars 13 of the washer 11 have correspondingly a groove 40 whose flank portions 42, 43 are initially spread apart as shown in dot-dash line a distance sufficient to enable the groove 40 to be disposed in front of the rib 39. The assembly is achieved by a plastic deformation which causes the two flank portions 42, 43 to move towards each other until they reach the position shown in full line.

Figure 8:
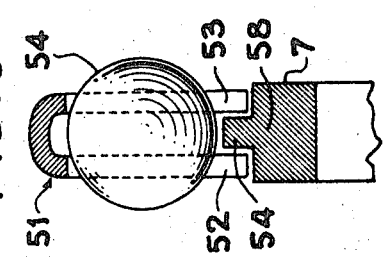
FIG. 8 is a partial view of a thrust rolling bearing in which the rolling elements are balls.

FIG. 8 shows a thrust rolling bearing whose washer 51 retaining the balls 54 is formed from a metal sheet folded onto itself so as to constitute two branch portions 52, 53 whose inner edge portions are disposed on each side of the rib 54 formed on the outer cylindrical periphery of the ring 58 which has a plane support face 7. The ring 58 is assembled with the washer 51 by preforming the washer 51 so that its two branch portions 52, 53 are sufficiently spread apart in the form of a V to be capable of being disposed on each side of the rib 54 and then moving these two branch portions towards each other by a plastic deformation until the two parts are axially and radially interconnected.

Figure 9:
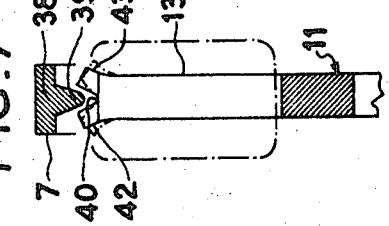
FIG. 9 is a partial view of a thrust needle bearing in which the cage is formed from a double thickness of sheet metal.

FIG. 9 shows a washer 61 which contains needles 4 and is also constituted by a metal sheet having a double thickness but the two branch portions 62 and 63 of the sheet are in mutual contact at their free end portions and the latter are engaged in a U-sectioned groove 67 produced by the press forming of a sheet metal ring 68. At its periphery, the washer 61 includes a loop portion 64 of such dimension that the bars 13 defining the apertures are sufficiently short to enable their end portions 13a to be positioned in alignment with the groove 67. A subsequent crushing of the loop portion 64 (arrows D, D') lengthens the bars and causes the end portions 13a to enter the groove 67.

Whereas in the embodiment shown in FIGS. 1-8 the surface of the rolling elements of the thrust rolling bearing remains as a rule out of contact with the ring of the cage carrying the sliding support face, FIG. 9 shows an embodiment in which the relative radial dimensions of the bars of the washer 61 and the groove of the ring 68 ensure the centering of the two parts of the cage by means of the inner end face of the needles 4.

For reasons of clarity of the drawing, means for axially retaining the rolling elements by the bars of the thrust bearing cage have not been shown. It will be understood that such means are normally provided, for example in the form of projecting portions carried by the bars and extending radially of the needles.

Having now described my invention, what I claim as new and desire to secure by Letters Patent is:

1. In a thrust rolling bearing comprising radially extending rolling elements all of which lie in one plane perpendicular to an axis of rotation of the bearing: a cage structure comprising a first part having radially extending bar portions defining apertures respectively containing and guiding the rolling elements, a second part in the form of a ring defining a plane sliding support face perpendicular to said axis of rotation and means for interconnecting the two parts in such manner that the two parts are free to rotate with respect to each other, the ring having a higher wear resistance than said first part of the cage structure.

2. In a thrust rolling bearing comprising a row of rolling elements which lie in radial planes containing an axis of rotation of the bearing: a cage structure comprising a first part having radially extending bar portions which have free end portions and define apertures respectively containing and guiding the rolling elements, a second part in the form of a ring defining a plane sliding support face perpendicular to said axis of rotation and means for connecting the free end portions of the bar portions to the ring in such manner that said two parts are free to rotate with respect to each other.

3. In a thrust rolling bearing comprising a row of rolling elements which lie in radial planes containing an axis of rotation of the bearing: a cage structure comprising a first part having radially extending bar portions which have free end portions and define apertures respectively containing and guiding the rolling elements, a second part in the form of a ring defining a plane sliding support face perpendicular to said axis of rotation, and an annular groove in the second part, the end portions of the bar portions being engaged and retained in the groove with clearance whereby the first part and second part are held assembled but are free to rotate with respect to each other.

4. In a thrust rolling bearing comprising radially extending rolling elements all of which lie in one plane perpendicular to an axis of rotation of the bearing: a cage structure comprising a first part having radially extending bar portions defining apertures respectively containing and guiding the rolling elements, a second part in the form of a ring defining a plane sliding support face perpendicular to said axis of rotation and means for interconnecting the two parts in such manner that the two parts are free to rotate with respect to each other, the ring having a higher wear resistance than said first part of the cage structure, said first part being a washer constituted by a metal sheet having a single wall.

5. A bearing as claimed in claim 2, wherein the first part is a washer constituted by a sheet of metal and having such shape as to define pairs of said bar portions between consecutive rolling elements.

6. In a thrust rolling bearing comprising two concentric rows of rolling elements which rolling elements lie in radial planes containing an axis of rotation of the bearing: a cage structure comprising a first part having radially extending bar portions which have free end portions and define apertures respectively containing and guiding the rolling elements of a first of said rows of rolling elements, a second part in the form of a ring defining a plane sliding support face perpendicular to said axis of rotation, a third part having radially extending bar portions which have free end portions and define apertures respectively containing and guiding rolling elements of a second of said rows of rolling elements, the second part being intermediate the first part and second part, and means for connecting the free end portions of the bar portions of the first part and the free end portions of the bar portions of the third part to the second part in such manner that the three parts are free to rotate with respect to each other.

7. In a thrust rolling bearing comprisng a row of rolling elements which lie in radial planes containing an axis of rotation of the bearing: a cage structure comprising a first part having radially extending bar portions which have free end portions and define apertures respectively containing and guiding the rolling elements, a second part in the form of a ring defining a plane sliding support face perpendicular to said axis of rotation, an annular rib on the ring and the free end portions of the bar portions respectively defining a recess in which the rib is engaged with clearance, whereby the first part and second part are held assembled but are free to rotate with respect to each other.

8. A bearing as claimed in claim 2, wherein the ring is constituted by a press-formed metal sheet having a U-shaped section which defines an annular groove, the free end portions of the bar portions being engaged in the groove and forming said connecting means.

9. A bearing as claimed in claim 2, wherein the axial dimension of the ring exceeds the thickness of the first part.

10. In a thrust rolling bearing comprising means defining two races and a row of rolling elements which lie in radial planes containing an axis of rotation of the bearing and are interposed between the races: a cage structure comprising a first part having radially extending bar portions which have free end portions and define apertures respectively containing and guiding the rolling elements, a second part in the form of a ring defining a plane sliding support face perpendicular to said axis of rotation and means for connecting the free end portions of the bar portions to the ring in such manner that said two parts are free to rotate with respect to each other, the ring being capable of coming in contact with the means defining one of the races without the bar portions being capable of contacting the means defining one of the races or capable of axially contacting the rolling elements.

11. A bearing as claimed in claim 2, comprising means for substantially centering the two parts with respect to each other, the centering means comprising end faces of the rolling elements and an annular face on the ring which guides the end faces of the rolling elements with a slight clearance.

12. A coaxial assembly of a thrust rolling bearing and a radial needle bearing, the needle bearing having needles having end faces adjacent the thrust rolling bearing, the thrust rolling bearing comprising a row of rolling elements which lie in radial planes containing the axis of the two bearings, a cage structure comprising a first part having radially extending bar portions which have free end portions and define apertures respectively containing and guiding the rolling elements, a second part in the form of a ring defining a plane sliding support face perpendicular to said axis, and means for connecting the free end portions of the bar portions to the ring in such manner that said two parts are free to rotate with respect to each other, the sliding support face being in sliding contact with said end faces of the needles.

13. A coaxial assembly of a thrust rolling bearing and a radial needle bearing, the needle bearing having needles and a cage having apertures containing and guiding the needles, the thrust rolling bearing comprising a row of rolling elements which lie in radial planes containing the axis of the two bearings, a cage structure comprising a first part having radially extending bar portions which have free end portions and define apertures respectively containing and guiding the rolling elements, a second part in the form of a ring defining a plane sliding support face perpendicular to said axis, and means for connecting the free end portions of the bar portions to the ring in such manner that the two parts are free to rotate with respect to each other, the sliding support face being in sliding contact with an end of the radial bearing cage.

14. In a thrust rolling bearing comprising radially extending rolling elements all of which lie in one plane perpendicular to an axis of rotation of the bearing: a cage structure comprising a first part constituted by a washer which is of sheet material and has radially extending bar portions defining apertures respectively containing and guiding the rolling elements, a second part in the form of a ring defining a plane sliding support face perpendicular to said axis of rotation and means for interconnecting the two parts in such manner that the two parts are free to rotate with respect to each other, the ring having a higher wear resistance than said first part of the cage structure.

15. In a thrust rolling bearing comprising radially extending rolling elements all of which lie in one plane perpendicular to an axis of rotation of the bearing: a cage structure comprising a first part constituted by a washer which has an annular peripheral portion and a plurality of pairs of radially extending bar portions extending from the peripheral portion and defining with circumferentially adjacent pairs of bar portions apertures respectively containing and guiding the rolling elements, a second part in the form of a ring defining a plane sliding support face perpendicular to said axis of rotation and means for interconnecting the two parts in such manner that the two parts are free to rotate with respect to each other, the ring having a higher wear resistance than said first part of the cage structure.

* * * * *